United States Patent [19]

Kardys et al.

[11] Patent Number: 5,695,533
[45] Date of Patent: Dec. 9, 1997

[54] ABRASIVE PRODUCTS

[75] Inventors: Gary J. Kardys, North Greenbush; Wendy A. Herrick, Clifton Park, both of N.Y.

[73] Assignee: Norton Company, Worcester, Mass.

[21] Appl. No.: 708,279

[22] Filed: Sep. 6, 1996

[51] Int. Cl.⁶ ............................................. B24D 11/00
[52] U.S. Cl. .................................... 51/295; 51/297
[58] Field of Search ........................... 51/293, 295, 309; 451/532

[56] References Cited

U.S. PATENT DOCUMENTS

| | | | |
|---|---|---|---|
| 2,876,086 | 3/1959 | Raymond | 51/298 |
| 5,009,676 | 4/1991 | Rue et al. | 51/309 |
| 5,092,910 | 3/1992 | Dekok et al. | 51/295 |
| 5,103,598 | 4/1992 | Kelly | 51/295 |

FOREIGN PATENT DOCUMENTS 2029390  10/1970  France ................ B24D 11/00

*Primary Examiner*—Deborah Jones
*Attorney, Agent, or Firm*—David Bennett

[57] ABSTRACT

Coated abrasive materials can be made from a backing material with abrasive particles adhered to the backing through an orienting layer in the form of a mesh of a size and dimensions to ensure that the orientation of the grits substantially perpendicular to the coating material is maintained.

1 Claim, 2 Drawing Sheets

ABRASIVE PRODUCTS

BACKGROUND OF THE INVENTION

This invention relates to coated abrasive products and specifically to coated abrasives made using abrasive grits with a weak shape.

In the production of coated abrasives the conventional technique employed is to coat a substrate with a curable maker coat and then to apply abrasive grits to the maker coat before it has become cured such that the grits are retained by the maker coat and are thereby anchored to the backing material. A size coat is conventionally applied over the grits to provide secure anchorage while the coated abrasive is actually in use. To enhance the performance of the abrasive grits, especially in the grinding of metals such as steels, it is often conventional to apply over the size coat a supersize coat comprising a binder and a grinding aid. This grinding aid decomposes during use and the decomposition products facilitate removal of metal from the workpiece. The grinding aid, to be most effective, should be located at the point of grinding, as close as possible to the point at which the abrasive grit contacts the metal workpiece.

The abrasive grits are conventionally applied to the maker coat using an electrostatic technique in which the grits are projected towards the maker coat. This application technique tends to align the grits such the longest dimension is perpendicular to the plane of the backing when the grit is anchored in place. This arrangement is very advantageous to the finished coated abrasive since it presents the smallest surface area of grit to the workpiece and maximizes the applied force per grit and therefore the effectiveness of the abrading process at a given power output.

In some respects however this can be a disadvantage since, if the grits have a weak shape, (defined as having a ratio of the longest dimension to the largest dimension perpendicular to the longest dimension, or "aspect ratio", (greater than 1.5) the supersize layer tends to collect in the spaces between the grits and thus be removed from the grit tips, unless unusually large amounts of size coat and/or supersize coat are used. In addition if the grit projects too far above the level of the anchoring size coat, the moment exerted when the grit contacts the workpiece can result in a large portion of the exposed grit being broken away or the whole grit may be torn out. Thus with weak shaped grits, there is often a need to use a large amount of the expensive size coat formulation.

The abrasive grits are conventionally applied either by gravity coating or by an electrostatic process in which the grits are impelled towards the surface to be coated by electrostatic forces. This is referred to as the UP coating technique.

In such processes the product is conventionally obtained in the form of a roll which is then cut to form discs or strips some of which may be formed into belts. Clearly such a process implies the parallel formation of a significant amount of waste material. Particularly when the abrasive grit cost is a significant element in the overall cost of the product, this is a waste that it is desirable to avoid.

In recent years a new form of abrasive grit has been developed. This grain has a filamentary particle form with a substantially uniform cross-sectional shape and a length dimension perpendicular to that cross-section that is at least as long as the greatest dimension of the cross-section. The ratio of the longest dimension to the greatest dimension perpendicular to the longest dimension is known as the "aspect ratio". This same measurement is also used to describe grits without a consistent cross-sectional shape. As explained above all grits having an aspect ratio greater than 1.5 are described generically as having a "weak" shape.

One form of such grits is made from a sol-gel alumina that has been shaped into a filamentary particle shape before it is dried and fired to produce a remarkably effective abrasive grit. Such grits are described in U.S. Pat. No. 5,009,676 and coated abrasives made using such grits are described in U.S. Pat. No. 5,103,598.

Such grits are remarkably effective in coated abrasives but their efficiency can be lowered if the orientation of the grits is parallel rather than perpendicular to the backing material. Such disfavored misalignment however can easily occur as a result of the deposition process or subsequent handling of the coated abrasive. For example, although with an UP deposition process, the tendency is for the grits to be projected towards the substrate such that the longest dimension is perpendicular to the backing, this preferred alignment can be disturbed by impact from other grits. The application of the size coat can also disturb this alignment either because of contact with the delivery system or by the action of the surface tension of the size coat. Finally it is possible that the orientation could be disturbed by passage around a roller before the size coat has full anchored the grits in position.

Another form of weak shaped grits is obtainable by crushing larger bodies using a roll crusher. These however, while predominantly "weaker" in shape than impact crushed abrasive grits, do not in general have more than about 20% of the grits with an aspect ratio of more than 2:1.

It has now been found that coated abrasives comprising weak shaped abrasive grits, such as filamentary abrasive grits, can be obtained in a highly flexible and efficient way that permits the "customizing" of a coated abrasive to a specific application. Use of the technique results in minimum wastage of grits.

Use of the present invention also avoids the danger that weak shaped grits deposited on a substrate may be constrained to adopt a position that departs from the desired orientation before the binder has hardened to the extent that the orientation has become fixed.

GENERAL DESCRIPTION OF THE INVENTION

The present invention provides a coated abrasive having a backing layer and an abrasive layer adhered thereto, said abrasive layer comprising a maker coat, weak shaped abrasive grits wherein at least 25% of the grits have an aspect ratio greater than 2 and an orienting mesh adhered to the maker layer and constraining a majority of the weak shaped abrasive grits to maintain an orientation substantially perpendicular to the backing layer.

For the purposes of this specification, the term "substantially perpendicular" is understood to include orientations that depart from the perpendicular by as much as 45°.

The orienting mesh can also have the function of raising the surface level of a size coat applied over the abrasive layer such that the weak shaped abrasive grits are adhered over a greater proportion of their length without the necessity to increase the actual volume of the size used. This also has the consequence that a supersize coat applied over the size coat and containing an adjuvant, such as a grinding aid or an antistatic control additive to reduce "loading", will place the adjuvant closer to the tips of the abrasive grits where it is most effective.

The orienting mesh is also effective to ensure that the weak shaped abrasive grits are more uniformly spaced such that a more open coat can be obtained. Where the grits are of a premium grade, this can result in a much more effective utilization of the material and yield results that are often superior to those obtained with more closed coats which comprise a higher proportion of the weak shaped abrasive grits.

The invention also comprises a process for the production of a coated abrasive which comprises application of a maker coat to a backing material and the application to said maker coat of an orienting mesh and, by an electrostatic deposition process, a layer comprising weak shaped abrasive grits with at least 25% of said grits having an aspect ratio of at least 2:1, and thereafter at least partially curing the maker coat such that the orienting mesh maintains the weak shaped abrasive grits in a position that is substantially perpendicular to the backing material.

SPECIFIC DESCRIPTION OF THE INVENTION

The orienting mesh that provides the advantages of the present invention, preferably comprises apertures that are larger than the largest cross-sectional dimension perpendicular to the longest dimension of the abrasive particles, and smaller than the average longest dimension of the weak-shaped abrasive grits. When abrasive grits are UP coated onto a maker coat to which such a mesh has been applied, the mesh acts as an interfering grid, only permitting grits oriented such that the longest dimension is substantially perpendicular to the backing to penetrate the mesh and contact the maker coat and become bonded thereto. The mesh then acts to buttress the abrasive grits in this orientation during subsequent processing. Such a mesh can also be used in conjunction with non-abrasive particles with these particles applied over the abrasive layer and before application of the size coat and acting to reduce the amount of size needed to anchor the particles effectively.

The orienting mesh is clearly most effective if the weak shaped abrasive grits have a substantially uniform cross-section such that the mesh size can be more closely correlated with the abrasive dimensions to provide more effective and uniform buttressing of the grits in the desired orientation.

The mesh can be of any suitable material such as cotton, polyester, nylon, glass-fiber and the like. The mesh can be a woven material or can be formed by any other suitable manner such as by cutting apertures from an extruded film, directly extruding a mesh structure or punching appropriately sized holes from a non-woven fabric. The technique for obtaining the mesh is less important than the dimensions of the mesh so obtained.

Where the mesh is formed from fibers, for example by weaving, these can be monofilament or multifilament or spun. Generally monofilament meshes are preferred. Preferably the mesh is a square mesh and the thickness of the fibers, (which term is used for simplicity but is understood to refer to any type of mesh-forming structural element), forming the mesh is at least 25% and more preferably at least 35% of the longest dimension of the weak shaped abrasive grits. The spacing between the fibers forming the mesh is preferably related to the dimensions of the abrasive particles. Thus, if the average longest dimension of the weak shaped abrasive grits is "1", the spacing between the fibers forming the mesh, "s", should be less than "1" and preferably "1" is at least 1.5 s and more preferably at least 2 s, for example up to 4 s. The use of such a mesh can also act to strengthen the coated abrasive product and give it more dimensional stability.

Each aperture in the mesh is preferably sized to accommodate one abrasive grit though the apertures can be much larger and capable of accommodating more, for example up to about six or even ten grits.

The weak shaped abrasive grits comprise at least 25% and more preferably 40%, and most preferably at least 80% of particles with an aspect ratio of at least 2:1. These are most suitably the result of a shaping process that results in a uniform cross-sectional shape such as round, star-shaped, rectangular or polygonal. Suitable processes include extrusion of a sol-gel alumina followed by cutting, (if necessary), drying and firing; molding; screen printing and the like.

It is also possible to use the weak shaped abrasive grits produced by the explosive comminution process described in PCT Patent Application Number PCT/US 96/04137.

The preferred abrasive grits comprise alumina and most preferably a sol-gel alumina. However other materials such as silicon carbide, fused alumina/zirconia, cubic boron nitride and diamond can be used. It is possible to use blends of premium weak shaped abrasive grits with cheaper less effective abrasives and with conventional fillers such as calcium carbonate, wollastonite and the like.

The nature of the backing material is not critical and woven, knit or stitchbonded fabrics are quite suitable for the practice of the invention. In addition polymer films and the usual range of treated papers may also be used. The backings may be prepared in the conventional way by application of one or more of filler, back-size and front size formulations and adhesion promoters.

DESCRIPTION OF PREFERRED EMBODIMENTS OF THE INVENTION

The invention is first described with reference to the Drawings appearing as FIGS. 1 of the attached drawings which are solely for the purpose of illustration and are intended to imply no necessary limitation on the scope of the invention.

Figure 1:
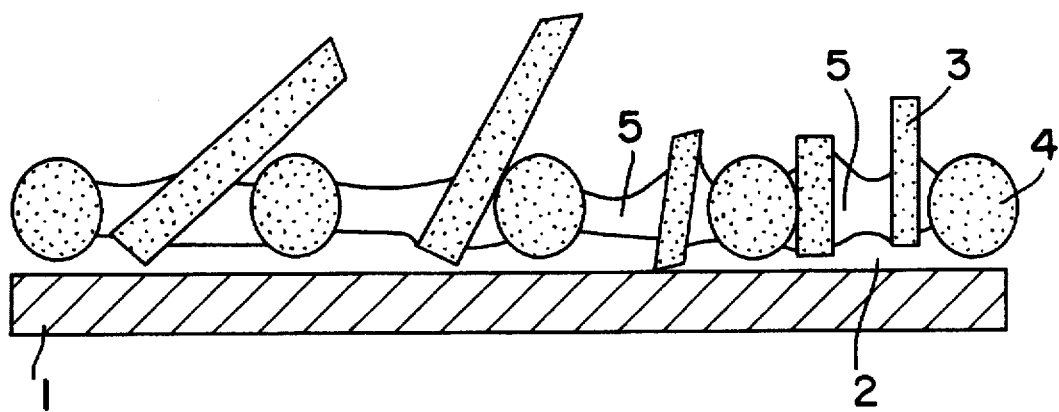
FIG. 1 is a diagrammatic cross-section of an embodiment of the invention in which the orientation layer is provided by a mesh.

FIG. 1 of the Drawings shows in cross-section a construction in which the orienting mesh is seen in cross-section. The backing material, 1, has a maker coat, 2, applied to one surface and the mesh is applied over the maker coat. In FIG. 1, the fibers of the mesh which are aligned perpendicular to the line of cross-section appear in cross-section, 4. The weak shaped abrasive grits, 3, are adhered to the maker coat and anchored by the size coat, 5. The grits are constrained by the mesh from falling over as a result of being impacted by other grits or being pushed over by subsequent handling or manipulation or being dragged down by the influence of the maker or size coat surface tension before these are cured.

Figure 2:
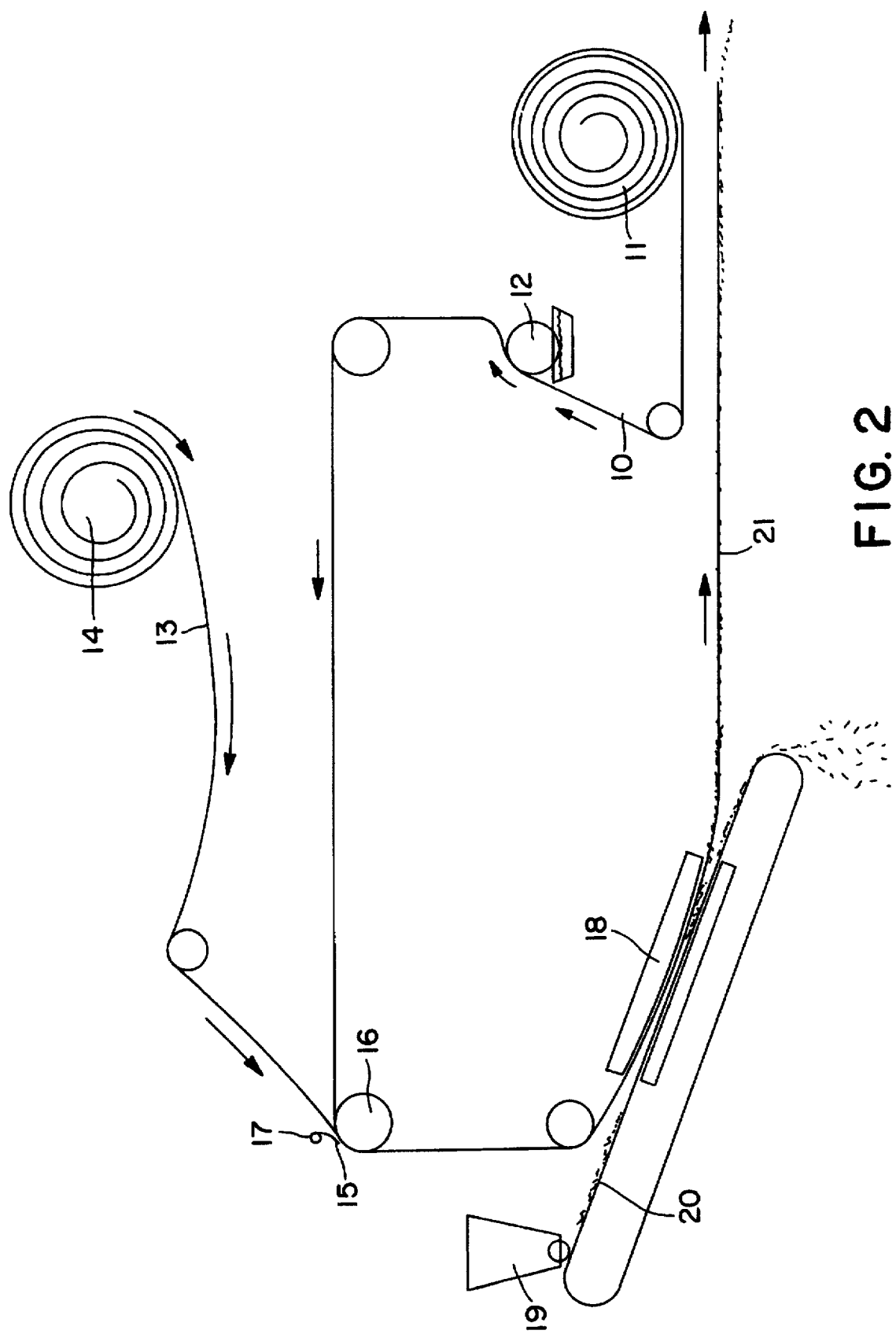
FIG. 2 is a stylized representation of equipment useful for the construction of a coated abrasive similar to that shown in FIG. 1.

In FIG. 2 there is a schematic representation of a process for the production of a coated abrasive according to the invention as embodied in FIG. 1. A web, 10, that will provide the backing material is unwound from a roll, 11, and advanced to a nip coater, 12, where a maker coat is applied to one surface of the web. At the same time a mesh, 13, is unwound from a roll, 14, and forwarded to a lamination station, 15, provided by a roll, 16, and a leaf spring, 17, where it is laminated to the backing material on the face bearing the maker coat. The laminate is then forwarded to a UP coating device, 18, where abrasive grits are deposited from a hopper, 19, on to a moving conveyor, 20, upon which they are UP coated on to the surface of the backing material to which the mesh has been laminated. The coated abrasive is then forwarded to separate stations, (not shown), at which the maker coat is at least partially cured and a size coat, and optionally a supersize coat, are applied and subsequently cured.

Further exemplification of the invention is provided by the following Example.

EXAMPLE 1

Four products were produced using a cloth substrate and a phenolic resin maker coat. The abrasive grits in each case were filamentary abrasive grits made by extruding a seeded sol-gel alumina and firing the product to form weak shaped abrasive grits with an average aspect ratio of 3.5:1. In two of the products a mesh was laminated to the maker coat before the abrasive grits were adhered to the maker coat. The space between the fibers of the mesh was less than 1.7 d where "d" is the average diameter of the filamentary abrasive grits. Identical size coats were applied to each sample. The mesh chosen was a nylon mesh with 7 square apertures per centimeter. The spacing between adjacent warp or fill fibers was 1.4 mm.

A heavy coat of filamentary abrasive grits was applied to one of the samples without a mesh, (Control 1). With the second mesh-less sample, (Control 2), a low application weight was used, corresponding respectively to "closed" and "open" coats. The two samples of coated abrasive having a mesh orienting layer received an amount of abrasive grits lower than the "open" coated meshless coated abrasive. In all respects other than the amount of grits applied and the presence or absence of the mesh, the four products were identical in composition and manner of production.

The samples were evaluated using the 112 DsH test procedure which is a high pressure dulling test wherein a fiber disc is applied to grind the one eighth inch thick edge of a 1018 carbon steel angle iron. The angle-shaped piece is first weighed and then mounted on a specimen holder which reciprocates back and forth over a distance of about 25 cm at a rate of 8.5 strokes per minute and a linear speed of 2.5 smpm (surface meters per minute). The abrasive disc is rotated at 3450 rpm and the disc is pressed against the angle iron with a force of 53.4N.

The results are displayed in Table 1 below.

TABLE 1

|  | MESH | APPLIED GRITS WT.* | TOTAL CUT (% OF CONTROL 1) |
|---|---|---|---|
| Control 1 | NO | 89 | 100% |
| Control 2 | NO | 48 | 84% |
| Invention 1 | YES | 36 | 80% |
| Invention 2 | YES | 37 | 91% |

*measured in pounds per sandpaper makers ream.

Thus with about 25% less abrasive grit the products according to the invention are at least comparable to, in terms of material cut, and sometimes better than, those products without the orienting mesh and a "low" application weight. It is quite clear therefore that the abrasive grits are used much more efficiently when the orienting mesh is present.

What is claimed is:

1. A coated abrasive having a backing layer and an abrasive layer adhered thereto, said abrasive layer comprising a maker coat, abrasive grits having a uniform cross-sectional shape and an aspect ratio greater than 2 and an orienting mesh adhered to the maker layer and constraining a majority of the abrasive grits to maintain an orientation substantially perpendicular to the backing layer wherein the mesh has openings that are wider than the greatest cross-sectional dimension of the abrasive grits and smaller than the average greatest dimension of the abrasive grits.

* * * * *